United States Patent
Zhang

(10) Patent No.: US 10,839,496 B2
(45) Date of Patent: Nov. 17, 2020

(54) MULTIPLE EXPOSURE METHOD, TERMINAL, SYSTEM, AND COMPUTER READABLE STORAGE MEDIUM

(71) Applicant: TENCENT TECHNOLOGY (SHENZHEN) COMPANY LIMITED, Guangdong (CN)

(72) Inventor: Zijun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 147 days.

(21) Appl. No.: 15/775,881

(22) PCT Filed: Aug. 1, 2017

(86) PCT No.: PCT/CN2017/095437
§ 371 (c)(1),
(2) Date: May 14, 2018

(87) PCT Pub. No.: WO2018/024195
PCT Pub. Date: Feb. 8, 2018

(65) Prior Publication Data
US 2018/0300863 A1  Oct. 18, 2018

(30) Foreign Application Priority Data
Aug. 5, 2016  (CN) .......................... 2016 1 0638819

(51) Int. Cl.
*G06K 9/46*  (2006.01)
*G06K 9/32*  (2006.01)
(Continued)

(52) U.S. Cl.
CPC .............. *G06T 5/50* (2013.01); *G06F 16/58* (2019.01); *G06F 16/9535* (2019.01);
(Continued)

(58) Field of Classification Search
None
See application file for complete search history.

(56) References Cited

U.S. PATENT DOCUMENTS 8,947,421 B2 *  2/2015  Uetabira .................. G06T 17/05
                                                       345/419
2005/0162523 A1 *  7/2005  Darrell ................... G06F 16/951
                                                       348/211.2
(Continued)

FOREIGN PATENT DOCUMENTS

CN          101046802 A      10/2007
CN          102238466 A      11/2011
(Continued)

OTHER PUBLICATIONS

Getty Images (Getty Images keyword guide, http://www.guliver.ro/wp-content/uploads/Guliver_-_Getty_Images_Keyword_Guide.pdf, Jul. 23, 2009) (Year: 2009).*
(Continued)

*Primary Examiner* — Randolph I Chu
(74) *Attorney, Agent, or Firm* — Sughrue Mion, PLLC

(57) ABSTRACT

A multiple exposure method is provided. A material picture acquisition request including a search keyword is sent, by a terminal, to a server and a material picture is received in response to the material picture acquisition request. The search keyword includes geographic location information based upon which the material picture is obtained among material pictures associated with corresponding picture associated information. The picture associated information includes picture location information. The material picture is processed by the terminal based on a resolution of a currently captured picture and content of the material picture to obtain a fusion region. Mixing synthesis is performed, by the
(Continued)

terminal, on the fusion region and the currently captured picture to obtain a mixed frame.

18 Claims, 16 Drawing Sheets

(51) Int. Cl.
  *G06K 9/00* (2006.01)
  *G06T 5/50* (2006.01)
  *G06F 16/9535* (2019.01)
  *G06F 16/9537* (2019.01)
  *G06F 16/58* (2019.01)

(52) U.S. Cl.
  CPC ..... *G06F 16/9537* (2019.01); *G06K 9/00248* (2013.01); *G06K 9/00255* (2013.01); *G06K 9/3233* (2013.01); *G06K 9/4604* (2013.01); *G06K 9/4652* (2013.01); *G06T 2207/20221* (2013.01)

(56) References Cited

U.S. PATENT DOCUMENTS

| | | | | |
|---|---|---|---|---|
| 2008/0219589 | A1* | 9/2008 | Jung | H04N 1/00068 382/276 |
| 2012/0207386 | A1* | 8/2012 | Ofek | H04N 21/44 382/168 |
| 2015/0117783 | A1* | 4/2015 | Lin | G06T 11/60 382/195 |
| 2016/0196653 | A1* | 7/2016 | Grant et al. | G06T 7/0028 |
| 2016/0350826 | A1* | 12/2016 | Glasgow | G06T 7/0002 |

FOREIGN PATENT DOCUMENTS

| | | |
|---|---|---|
| CN | 103118230 A | 5/2013 |
| CN | 103293825 A | 9/2013 |
| CN | 103489002 | * 1/2014 |
| CN | 103489002 A | 1/2014 |
| CN | 103942807 A | 7/2014 |
| CN | 104637035 A | 5/2015 |
| CN | 104767939 A | 7/2015 |
| CN | 105208288 A | 12/2015 |
| CN | 105869189 A | 8/2016 |
| CN | 106294681 A | 1/2017 |

OTHER PUBLICATIONS

Shrinivasacharya et al. (An Image Crawler for Content Based Image Retrieval System, IJRET: International Journal of Research in Engineering and Technology eISSN: 2319-1163 | pISSN: 2321-7308, Nov. 2013). (Year: 2013).*

International Search Report of PCT/CN2017/095437 dated Oct. 26, 2017 [PCT/ISA/210].

Communication dated Nov. 13, 2018 from the State Intellectual Property Office of the P.R.C. in counterpart Application No. 201610638819.X.

Steve Sonheim and Cara Sonheim, "Creative photography lab", Jan. 31, 2015, 4 pages total.

Lushan Wenhua, "Corel VideoStudio X7 from beginner to advanced", Oct. 31, 2014, 5 pages total.

Communication dated Feb. 15, 2019 from the State Intellectual Property Office of the P.R.C. in counterpart Application No. 201610638819.X.

Written Opinion dated Oct. 26, 2017 issued by the International Searching Authority in PCT/CN2017/095437.

Communication dated May 17, 2019, from the State Intellectual Property Office of the P.R.C in counterpart application No. 201610638819.X.

Shi Ming Wei et al.,"Sony NEX-5R. NEX-3N. NEX-F3 Camera 100%: A Handbook Not Clear", Schweiming Research Laboratory, 2013, pp. 91-92, ( 4 pages total).

* cited by examiner 18a  18b

MULTIPLE EXPOSURE METHOD, TERMINAL, SYSTEM, AND COMPUTER READABLE STORAGE MEDIUM

CROSS-REFERENCE TO RELATED APPLICATIONS

This application is a U.S. national stage application under 35 USC 371 of International Application, PCT/CN2017/095437, filed on Aug. 1, 2017, in the Chinese Patent Office, which claims priority to Chinese Patent Application No. 201610638819.X, entitled "Multiple Exposure Method, Device and System", filed on Aug. 5, 2016, in the Chinese Patent Office, the disclosures of which are incorporated by reference in their entireties.

FIELD

One or more exemplary embodiments relate to computer technology, and particularly, relate to a multiple exposure method, a multiple exposure terminal, and a multiple exposure system, and a computer readable storage medium for multiple exposure.

BACKGROUND

Multiple exposure is a technique in photography that adopts two or more separate exposures and then overlaps photos to form a single photo. Parameters of each exposure may be different, and the synthesized photo produces a unique visual effect.

The conventional multiple exposure method generally may only synthesize a locally stored picture with a currently captured picture. If the locally stored picture does not match with the currently captured picture in artistic conception or size, it is difficult to synthesize a multiple exposure picture with high quality and desirable effect.

SUMMARY

One or more exemplary embodiments provide a multiple exposure method, a multiple exposure terminal, and a multiple exposure system, and a computer readable storage medium for multiple exposure.

According to an aspect of an exemplary embodiment, provided is a multiple exposure method. A material picture acquisition request including a search keyword is sent, by a terminal, to a server and a material picture is received in response to the material picture acquisition request. The search keyword includes geographic location information based upon which the material picture is obtained among material pictures associated with corresponding picture associated information. The picture associated information includes picture location information. The material picture is processed by the terminal based on a resolution of a currently captured picture and content of the material picture to obtain a fusion region. Mixing synthesis is performed, by the terminal, on the fusion region and the currently captured picture to obtain a mixed frame.

According to another aspect of an exemplary embodiment, provided is a terminal, including a memory and a processor. The memory stores computer readable instructions. The computer readable instructions, when executed by the processor, cause the processor to perform sending a material picture acquisition request including a search keyword to a server and receiving a material picture in response to the material picture acquisition request. The search keyword includes geographic location information based upon which the material picture is obtained among material pictures having corresponding picture associated information. The picture associated information includes picture location information. The computer readable instructions further cause the processor to perform processing the material picture based on a resolution of a currently captured picture and content of the material picture to obtain a fusion region. The computer readable instructions further cause the processor to perform mixing synthesis on the fusion region and the currently captured picture to obtain a mixed frame.

According to still another aspect of an exemplary embodiment, provided is a non-transitory, non-volatile computer readable storage medium storing computer readable instructions. The computer readable instructions, when executed by one or more processors, cause the one or more processors to perform: sending, by a terminal, a material picture acquisition request including a search keyword to a server and receiving a material picture in response to the material picture acquisition request. The search keyword includes geographic location information based upon which the material picture is obtained among material pictures associated with corresponding picture associated information. The picture associated information includes picture location information. The computer readable instructions further cause the one or more processors to perform processing the material picture based on a resolution of a currently captured picture and content of the material picture to obtain a fusion region, computer readable instructions, when executed by one or more processors, cause the one or more processors to perform mixing synthesis on the fusion region and the currently captured picture to obtain a mixed frame.

According to still another aspect of an exemplary embodiment, provided is a multiple exposure system, including a first server and a terminal. The first server is configured to receive a material picture acquisition request including a search keyword including geographic location information. The first server is configured to search based on the search keyword to obtain a corresponding material picture, and return the material picture. The first server pre-stores material pictures and corresponding picture associated information. The picture associated information includes picture location information. The terminal is configured to process the material picture based on a resolution of a currently captured picture and content of the material picture to obtain a fusion region, and perform mixing synthesis on the fusion region and the currently captured picture to obtain a mixed frame.

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DETAILED DESCRIPTION

The details of one or more embodiments are set forth in the accompanying drawings and the description below. Other features and advantages of the disclosure will become apparent from the description, the accompanying drawings and the claims.

To describe the technical solutions of the disclosure clearly, the following briefly introduces the accompanying drawings that illustrate exemplary embodiments. Apparently, the accompanying drawings in the following description show only some embodiments, and a person of ordinary skill in the art may still derive other drawings from these accompanying drawings without creative efforts.

Figure 1:
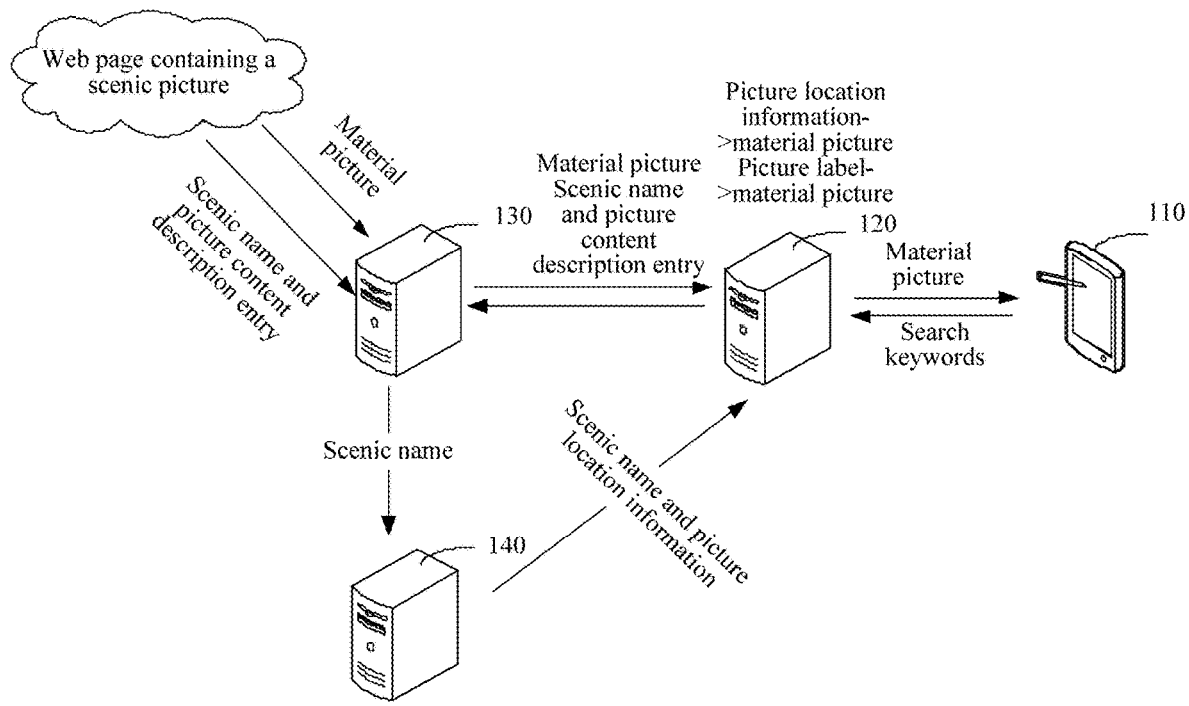
FIG. 1 is an application environment diagram of a multiple exposure method according to an exemplary embodiment.

FIG. 1 is an application environment diagram of a multiple exposure method according to an exemplary embodiment.

As shown in FIG. 1, the application environment includes a terminal 110, a first server 120, an information server 130 and a positioning server 140. The terminal 110, the first server 120, the information server 130 and the positioning server 140 communicate with one another through a network.

The terminal 110 may be a device with a camera, such as a smart camera phone, a tablet computer, a camera, etc., but is not limited thereto. The information server 130 crawls a web page containing a picture, e.g., a scenic picture to obtain a material picture and extracts a scenic name (e.g., a name of a scene) and a picture content description (or entry of the picture content description) from the web page to obtain a picture label. The information server 130 sends the scenic name to the positioning service 140 to acquire picture location information corresponding to the material picture. The first server 120 receives and stores the material picture, the picture label and the picture location information to establish an index. The terminal 110 sends a material picture acquisition request including search keywords to acquire the corresponding material picture from the first server 120, adjusts the material picture according to a resolution of a currently shot picture and the material picture to obtain a fusion region, and performs mixing synthesis on the fusion region and the currently shot picture to obtain a multiple exposure picture.

Figure 2:
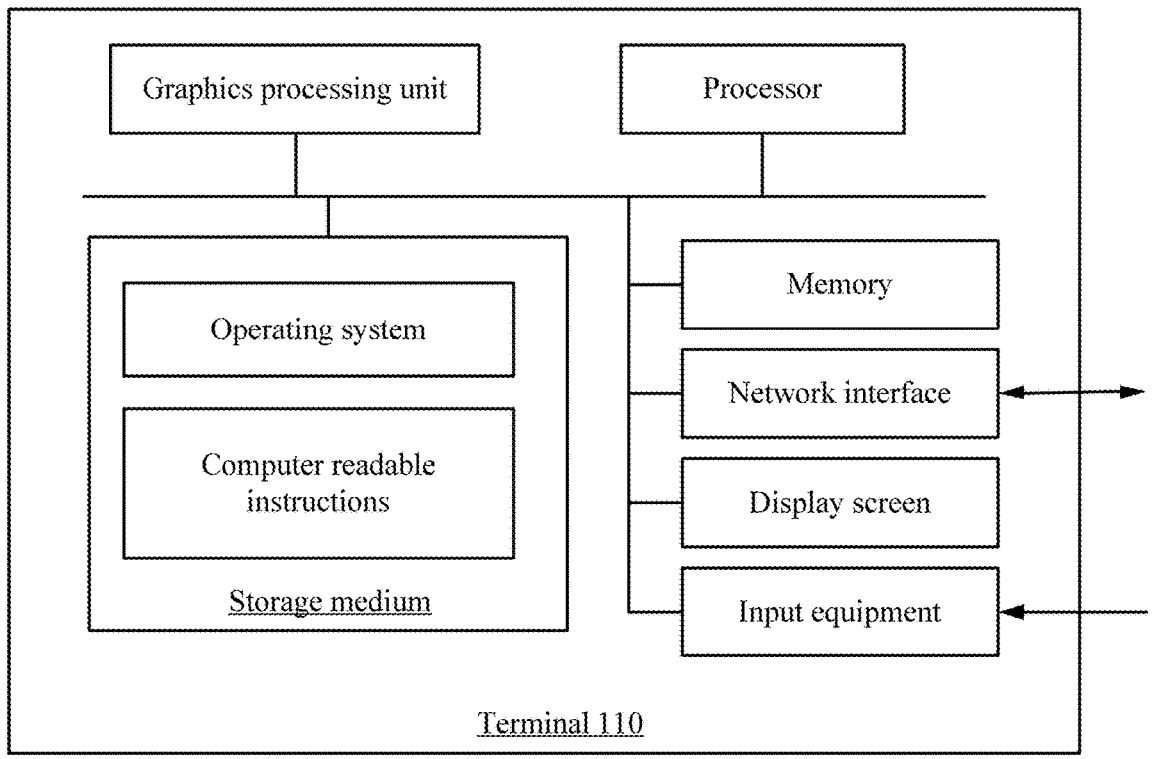
FIG. 2 is an internal structure diagram of a terminal in FIG. 1 according to an exemplary embodiment.

In one embodiment, an internal structure of the terminal 110 in FIG. 1 may be configured as shown in FIG. 2. According to an exemplary embodiment in FIG. 2, the terminal 110 includes a processor, a graphics processing unit, a storage medium, a memory, a network interface, a display screen and input equipment connected through a system bus, wherein the input equipment includes an image acquisition device. A storage medium of the terminal 110 stores an operating system, and further includes computer readable instructions. When the computer readable instructions are executed by the processor, the processor may implement a multiple exposure method. The processor is configured to provide computing and control capabilities that support the operation of the entire terminal 110. The graphics processing unit in the terminal 110 is configured to at least provide a drawing capability of a display interface. The memory provides an environment for the operation of the computer readable instructions in the storage medium. The network interface is configured to perform network communication with the first server 120, for example, to send a material picture acquisition request to the first server 120, etc. The display screen is configured to display an application interface and the like, for example, to display a mixed frame on a framing preview interface. The input equipment is configured to receive a command or data input by a user and acquire a current image, etc. For a terminal 110 with a touch screen, the display screen and the input equipment may be the touch screen.

Figure 3:
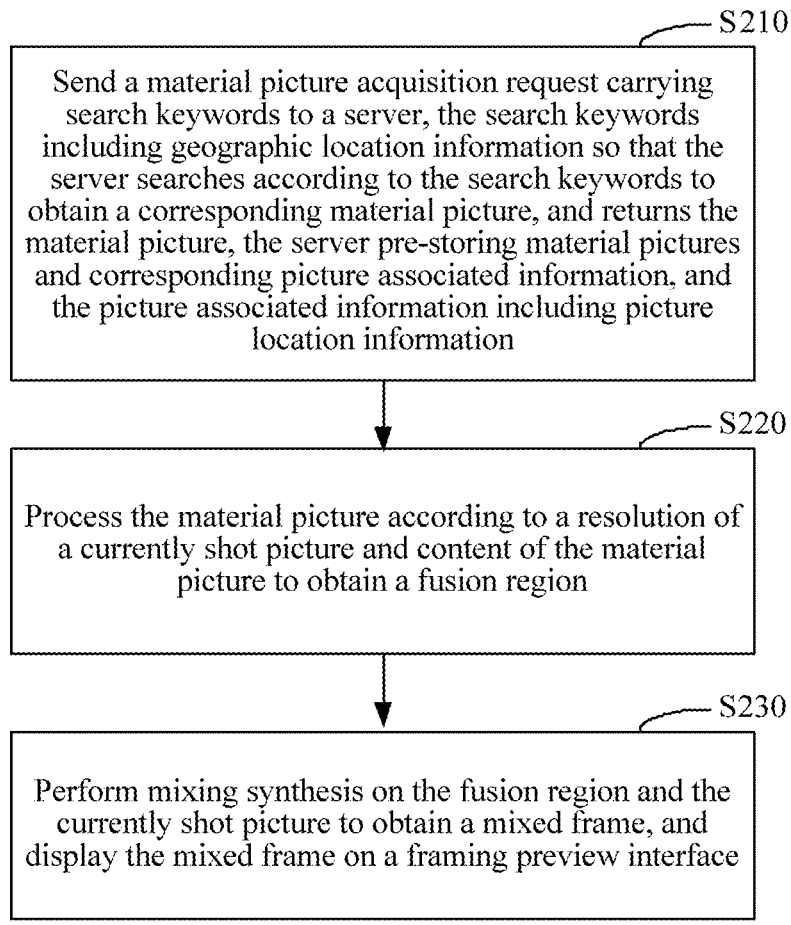
FIG. 3 is a flow diagram of a multiple exposure method according to an exemplary embodiment.

In one embodiment, as shown in FIG. 3, provided is a multiple exposure method. The method is illustrated using the terminal applied to the above application environment, and includes the following operations:

Operation S210: Send a material picture acquisition request including search keywords to a server, the search keywords including geographic location information so that the server searches according to the search keywords to obtain a corresponding material picture, and returns the material picture, the server pre-storing material pictures and corresponding picture associated information, and picture associated information including picture location information.

Specifically, when a multiple exposure application is opened, a material picture acquisition request including search keywords may be sent to a server. The multiple exposure application may be a separate picture acquisition application, or a picture acquisition module based on an instant messaging application or a social application. The geographic location information may be GPS coordinates, a location name, a scenic name, etc. Current geographic location information of the terminal may be acquired by a geographic location acquisition device of the terminal, so that when a user arrives at a destination during a travel, a professional high-quality material picture of a current location may be acquired from the server according to the current geographic location information, or a geographic location may be arbitrarily designated, so as to acquire a material picture corresponding to any site.

The search keywords may also include any other information related to the picture, for example, picture attribute information including a picture resolution, a picture shooting device parameters, and the like; for example, picture content description information (or information about picture content description) regarding a description of a subject of the picture including a river, clear seawater, white beach, a star name, and the like; and for example, picture subject information including picture upload user information (e.g., information regarding a user who uploaded the picture), such as information about a user's friend, to view a picture that was shot by a user's friend at the current location in the past. If the picture that was shot by the user's friend at the current location in the past includes a user's own portrait, a group photo with the friend at the same location may be realized through multiple exposures.

The server may search an accurate material picture according to multidimensional information through the keywords including multiple different types of information. The material picture may be a landscape picture, a character picture, an animation picture and the like, may be a professional high-definition picture of a website or a community, such as a professional photographic spot picture, and also may be a picture uploaded by a user. The server pre-stores material pictures and picture associated information. The picture associated information at least includes picture location information, so that the corresponding material picture may be obtained by accurately searching according to the geographic location information in the search keywords. The picture associated information may also include picture attribute information, picture content description information, picture subject information and the like, and is thus matched with the search keywords to obtain a target material picture of multidimensional search. By pre-storing a large number of material pictures and picture associated information and providing a professional picture search server, a user may obtain a material picture according to search keywords conveniently and quickly, and may obtain an accurate target picture according to the geographic location information.

In one embodiment, the search keywords further include picture content description information. The picture content description information is used for describing image content. By combining the picture content description information with the geographic location information, an accurate material picture may be obtained more conveniently. For example, the material picture may be determined as a picture of a famous Huangshan Greeting Pine through content description information "Pine" and geographic location information "Huangshan".

Operation S220: Process the material picture according to a resolution of a currently shot picture and content of the material picture to obtain a fusion region.

Specifically, according to the resolution of the currently shot picture and the content of the material picture, image processing operations such as image feature calculation, scaling, trimming and the like may be performed on the material picture and a position relation between the currently shot picture and the material picture may be determined to obtain a fusion region. A specific algorithm for acquiring the fusion region may be customized according to embodiments. Various image features, such as color distribution, texture distribution and edge distribution of the picture, may be calculated according to the content of the material picture. Face recognition, foreground and background separation, target tracking and the like may be performed on the picture. In addition, the material picture is zoomed, trimmed and the like in combination with the image features and the resolution of the currently shot picture to determine a position relation between the currently shot picture and the material picture, and determine a final fusion region. For example, the currently shot picture is displayed in the center of the material picture, or the material picture is displayed in the center of the currently shot picture, or the currently shot picture is aligned with the material picture at edges. The specific position relation may be determined according to the image features of the material picture, for example, a portion of which the texture complexity is greater than a preset threshold in the material picture is retained, the currently shot picture may be matched with the material picture in image features, for example, a portion of which the color mean difference from the currently shot picture is small is acquired according to color distribution and is retained as a fusion region, and the portions with similar colors are fused to achieve a better multiple exposure effect.

Different processing processes may be divided into different fusion methods, each fusion method has a corresponding processing operation, a target fusion method is determined firstly according to the resolution of the currently shot picture and the content of the material picture, and the material picture is processed according to the processing operation corresponding to the target fusion method to obtain a fusion region. The fusion region in the material picture is intelligently selected according to representation of content details of the material picture and a resolution of a current framing mode, which improves the intelligence and the effect of multiple exposures.

Operation S230: Perform mixing synthesis on the fusion region and the currently shot picture to obtain a mixed frame, and display the mixed frame on a framing preview interface.

Specifically, before performing mixing synthesis on the fusion region and the currently shot picture, basic color of the currently shot picture may be adjusted, e.g., contrast, hue, saturation and the like may be adjusted, so that the picture has a certain style. During mixing synthesis, the fusion region and the currently shot picture may be arbitrarily located on an upper layer or a lower layer. The transparency of the fusion region and the currently shot picture may be adjusted, for example, the transparency of the fusion region and the currently shot picture may be adjusted through progress bar reception.

Different sub-filters may be included during mixing to form different mixing effects, e.g., color filtering, soft light or multiply sub-filters are respectively added to a filter processor chain of a camera lens, wherein one filter may be composed of a plurality of sub-filters, and each sub-filter is a basic image transformation operator. Pixel weighting coefficients of the fusion region and the currently shot picture may be set through a mask layer during mixing, thereby retaining a region of interest through different weighting coefficients, e.g., reducing the influence of the fusion region on the region of interest (e.g., a face region) in a fusion process, and retaining an image of the region of interest having improved quality (e.g., a clear face image). After the fusion region is superposed with the currently shot picture on pixels for first mixing to obtain a first mixed frame, base color processing may be performed on the retained region of interest, and second mixing on the base color frame and the first mixed frame is performed to obtain a second mixed frame, so that the region of interest transits naturally in the whole second mixed frame. Mixed frames with different multiple exposure effects may be formed using different sub-filters synchronously, and are displayed in a preview region at the same time, so that the user may select satisfactory exposure effects and the flexibility of multiple exposures is improved.

In an exemplary embodiment, a material picture acquisition request including search keywords is sent to a server, wherein the search keywords include geographic location information so that the server searches according to the search keywords to obtain a corresponding material picture, and returns the material picture, and the server pre-stores material pictures and corresponding picture associated information. By pre-storing a large number of material pictures and picture associated information, including picture location information, and providing a professional picture search server, a user may obtain a material picture according to the search keywords conveniently and quickly, and may obtain an accurate target picture according to the geographic location information, and the degree of fusion of multiple exposures is improved.

The material picture is processed according to a resolution of a currently shot picture and content of the material picture to obtain a fusion region, mixing synthesis is performed on the fusion region and the currently shot picture to obtain a mixed frame, the mixed frame is displayed on a framing preview interface, and the fusion region in the material picture is intelligently selected according to representation of content details of the material picture and a resolution of a current framing mode, so that the intelligence of multiple exposures and the picture quality are further improved.

In one embodiment, the material picture is a picture obtained by crawling a web page containing a scenic picture according to a crawler algorithm. The picture associated information includes a picture label and picture location information. The picture label includes keywords extracted from the web page.

Specifically, world wide web information may be automatically captured according to a certain rule by the crawler algorithm. By crawling the web page containing scenic pictures, a large number of scenic pictures may be gathered, and the collected scenic pictures may also be updated as time changes. For example, famous scenic photos of tourist information sites and official sites of tourist administrations and scenic pictures issued by web sites are generally high in quality and representative, so that the pictures of multiple exposures have higher quality and higher memorial significance, and the user viscosity of a multiple exposure application and the popularity among users are improved. Keywords also may be extracted from a web page to obtain a picture label, and the picture label may include two entries: a first entry is a scenic name of the picture, e.g., Nha Trang Silkworm Island, and a second entry is picture description content, e.g., clear seawater, white beach, etc. The picture label and/or the picture location information may be used as picture associated information, so that when search keywords are received, an accurate search result may be obtained according to a variety of different picture associated information. The keywords extracted from the web page are automatically used as picture associated information, so that the material picture and the picture label are acquired automatically, conveniently and quickly without manual intervention.

In one embodiment, a picture label includes a scenic name and a picture content description entry. Picture location information is location information returned by a positioning server according to a scenic name after a geographic location acquisition request including the scenic name is sent to the positioning server.

Specifically, a scenic name is sent to the positioning server, so that the positioning server returns accurate location information. The location information may be GPS location information. The positioning server specially provides a positioning service for pictures, and stores a large number of scenic names and corresponding accurate location information. Afterwards, a material picture of an accurate location may be obtained through searching using the GPS location information uploaded by a terminal. By acquiring the location information through the positioning server, the location information does not need to be manually added to each material picture, thereby providing a convenient and quick multiple exposure method.

Figure 4:
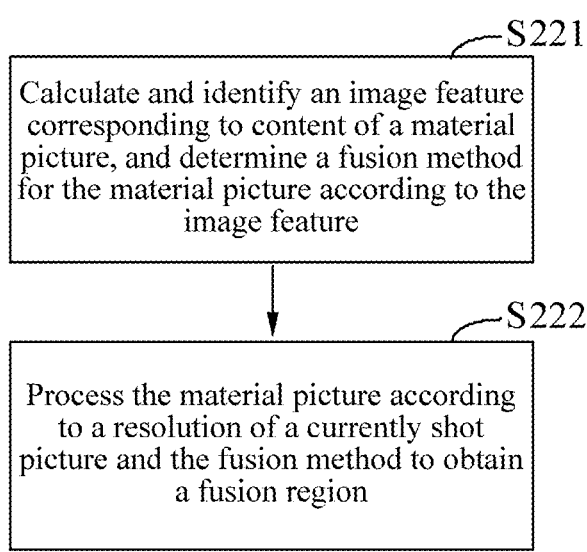
FIG. 4 is a flow diagram of obtaining a fusion region according to an exemplary embodiment.

In one embodiment, as shown in FIG. 4, operation S220 includes:

Operation S221: Calculate and identify an image feature corresponding to content of a material picture, and determine a fusion method for the material picture according to the image feature.

Specifically, the image feature includes a color feature, a texture feature, a shape feature, a spatial relation feature, etc. The fusion method for the material picture may be customized according to embodiments. Each fusion method includes a location relation between the material picture and a currently shot picture, a size relation between the material picture and the currently shot picture, and a scaling and trimming rule of the material picture, e.g., centering fusion, edge alignment fusion, spread fusion, etc.

According to the image feature corresponding to the content of the material picture, the most suitable fusion method for fusing the material picture and the currently shot picture is determined intelligently, wherein correspondence between the image feature and the fusion method may be customized as required. For example, if a complex texture portion of the material picture is identified, the portion with complex textures is retained as a fusion region, and a sky texture which is relatively flat may be removed during fusion. If the material picture identified according to the image feature is an abstract picture, pixel stretching or reducing may be performed on the picture to obtain the same resolution as the currently shot picture and perform complete fusion, because the abstract picture is generally in an irregular shape and an artistic conception of the picture is not destroyed by arbitrary stretching.

Referring back to FIG. 4, operation S220 includes:

Operation S222: Process the material picture according to the resolution of the currently shot picture and the fusion method to obtain a fusion region.

Specifically, the material picture is zoomed in or out according to the position relation, the zoom rule and picture size relation corresponding to the fusion method, and is trimmed to obtain a fusion region after the location is determined.

In an exemplary embodiment, each fusion method has a corresponding processing operation, and the material picture may be processed through a fixed processing operation to obtain a fusion region only by determining the corresponding fusion method according to an image feature, thereby providing a simple and quick multiple exposure method.

Figure 5:
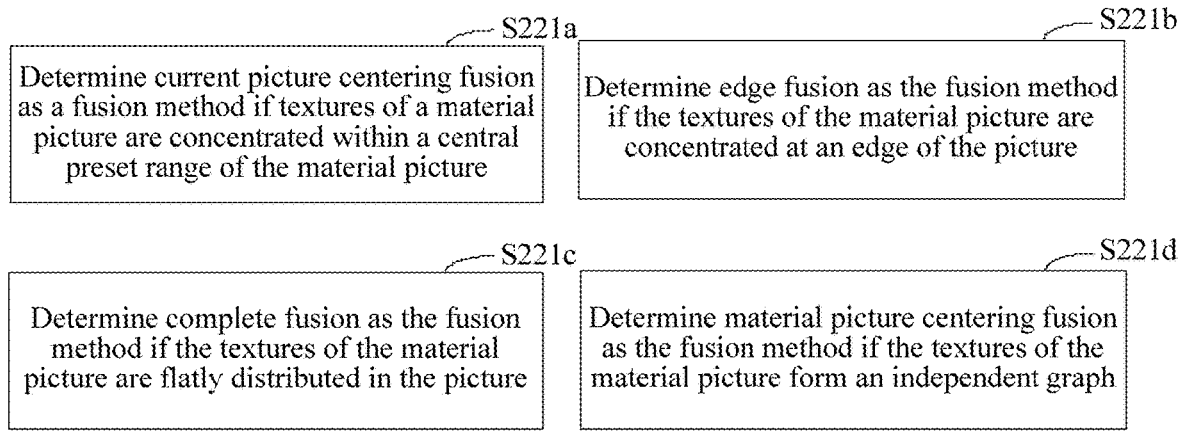
FIG. 5 is a flow diagram of determining a fusion method according to an exemplary embodiment.

In one embodiment, an image feature includes texture information. As shown in FIG. 5, operation S221 includes operation S221*a* to S221*d*:

Operation S221*a*: Determine current picture centering fusion as the fusion method if textures of the material picture are concentrated within a central preset range of the material picture. The current picture centering fusion refers to a process in which the material picture is superposed with a central region of the currently shot picture, and/or equivalently, the currently shot picture is placed in a central region of the material picture, and then the currently shot picture is fused with the central region of the material picture.

Specifically, a texture feature refers to regular distribution of gray values due to repeated arrangement of image pixels, the image texture feature may be extracted through a method based on a structure and a method based on statistical data to obtain texture distribution of a picture, and a region with complex textures is generally a region with large information content. The shape and size of the central preset range may be customized according to embodiments, e.g., the central preset range is a circle using a center of the picture as a circle center and a preset length as a radius, the central preset range also may be a square or an oblong, etc. For example, in response to texture complexity within the central preset range of the picture exceeding a mean texture of the material picture, textures of the material picture may be determined to be concentrated within the central preset range of the material picture, which indicates that the content of the material picture is focused in the center, and edge trimming is not needed.

Operation S221*b*: Determine edge fusion as the fusion method if textures of the material picture are concentrated at an edge of the picture.

Specifically, a picture edge where the textures of the material picture are concentrated may be determined based on a proportion of the texture complexity of the picture edge to a mean texture of the material picture. If it is determined that the textures of the material picture are concentrated at the edge of the picture, it indicates that the content of the picture is focused at the edge, the edge needs to be retained, and the edge fusion as the fusion method is performed, in which the edge where the textures are concentrated may be aligned with an edge of the currently shot picture and then are fused to ensure that the edge where the textures are concentrated remains in a mixed frame.

Operation S221*c*: Determine complete fusion as the fusion method if textures of the material picture are flatly distributed in the picture.

Specifically, if texture complexity of each part of the material picture is not substantially different (e.g., difference in texture complexity of each part of the material picture is equal to or less than a threshold), it indicates that the textures of the material picture are distributed substantially evenly and/or flatly in the picture, there is no key area, or the whole picture is a key area, and multiple exposures are performed through complete fusion. Complete fusion refers to a process in which the material picture is zoomed to the same size as the currently shot picture and is completely fused with the currently shot picture. The complete fusion may be suitable for a material picture with relative abstract content, e.g., an image of clouds or rainbows.

Operation S221*d*: Determine material picture centering fusion as the fusion method if textures of the material picture form an independent graph.

Specifically, the graph may be extracted from the material picture through a graphic outline detection algorithm. If the textures of the material picture form an independent graph, the graph needs to be completely retained in the currently shot picture. In this case, a material picture centering fusion method may be adopted. The material picture centering fusion refers to a process in which the material picture is superposed with the center of the currently shot picture, and/or equivalently, the material picture is placed in a central region of the currently shot picture, and then the currently shot picture is fused with an entire region of the material picture. This algorithm may be suitable for a material picture such as, for example, a LOGO or a totem shape or the like.

Figure 6:
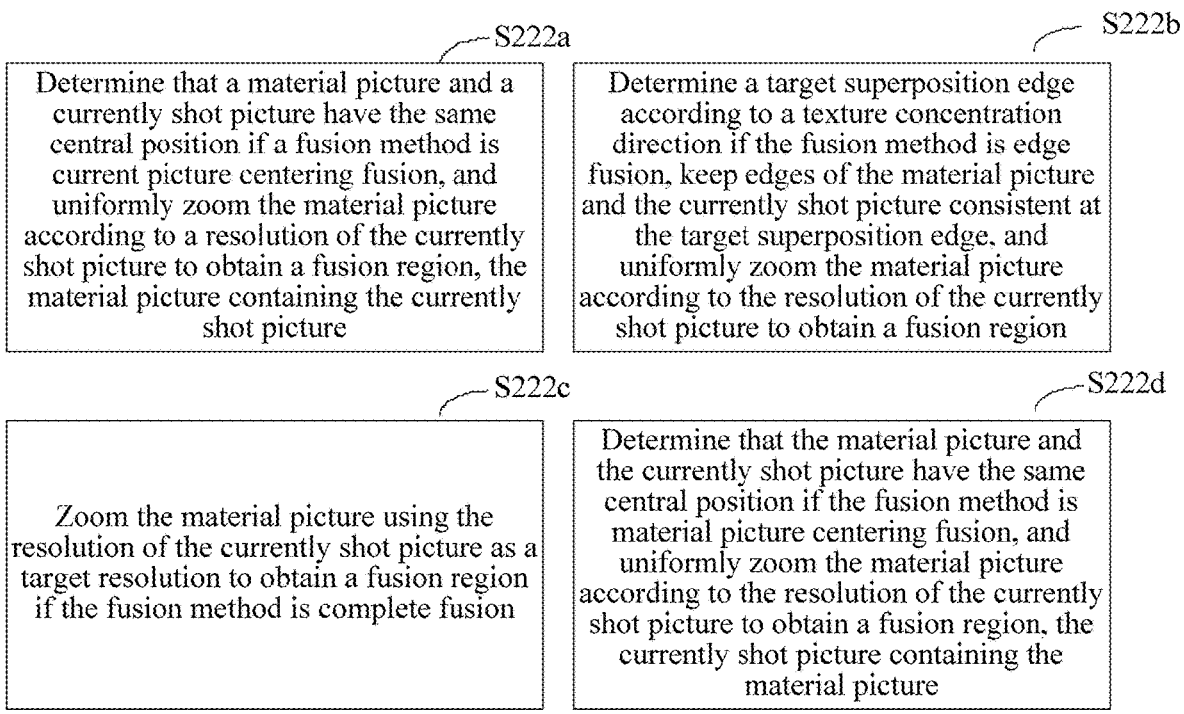
FIG. 6 is a flow diagram of determining a fusion region based on a fusion method according to an exemplary embodiment.

In one embodiment, as shown in FIG. 6, operation S222 includes operation S222a to S222d:

Operation S222a: Determine that the material picture and the currently shot picture have the same central position in response to a fusion method being current picture centering fusion, and uniformly (or substantially uniformly) zoom the material picture according to the resolution of the currently shot picture to obtain a fusion region, the material picture containing the currently shot picture.

Specifically, the material picture is uniformly zoomed in or out to contain the currently shot picture, and at least two opposite edges of the material picture are superposed with edges of the currently shot picture, that is, the material picture contains the currently shot picture, the center of a framing preview interface is superposed with the center of the material picture, and a portion of the material picture within the framing preview interface is acquired to obtain a fusion region.

Figure 7:
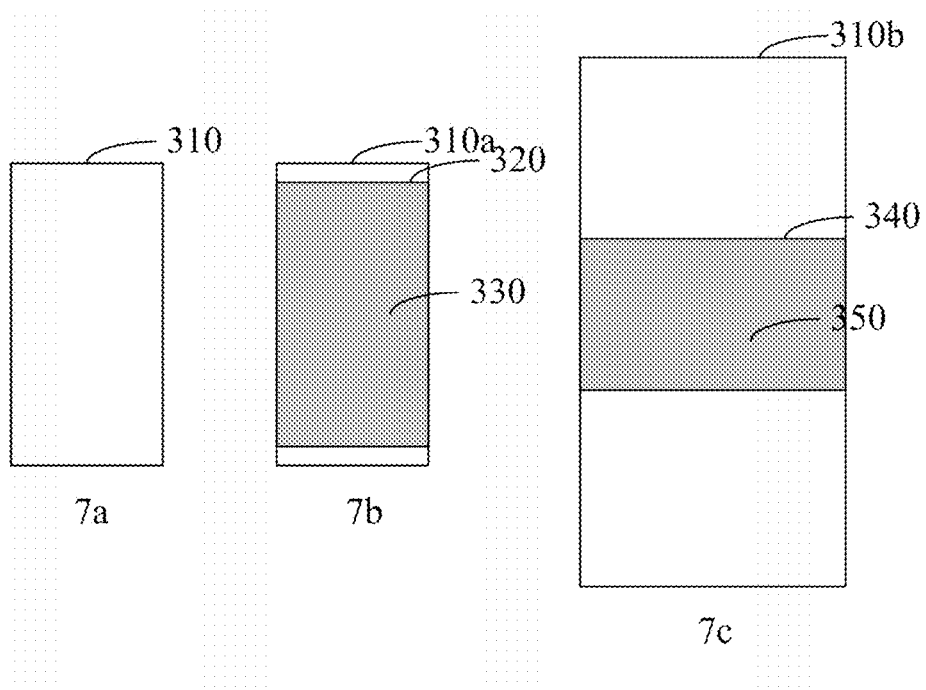
FIG. 7 is a schematic diagram of determining a fusion region of a vertical material picture on a vertical preview interface and a horizontal preview interface respectively during current picture centering fusion according to an exemplary embodiment.
Figure 8:
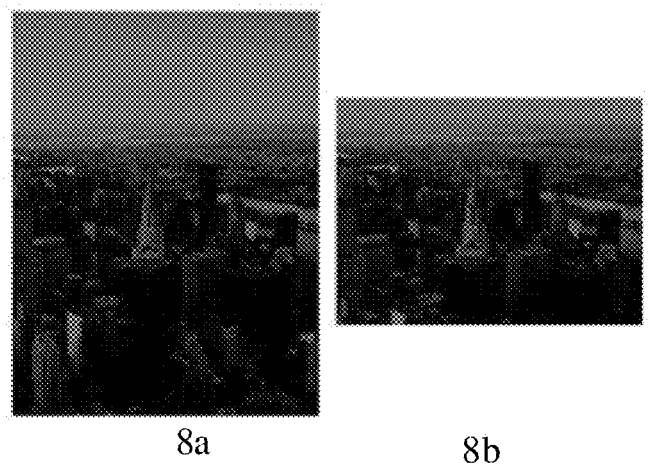
FIG. 8 is a schematic diagram of a fusion region picture determined on the vertical preview interface and the horizontal preview interface respectively during current picture centering fusion according to an exemplary embodiment.
Figure 9:
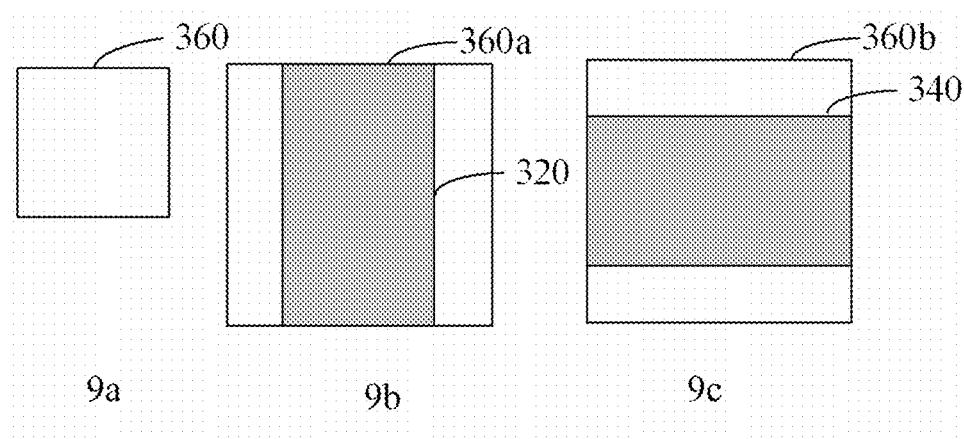
FIG. 9 is a schematic diagram of determining a fusion region of a square material picture on the vertical preview interface and the horizontal preview interface respectively during current picture centering fusion according to an exemplary embodiment.
Figure 10:
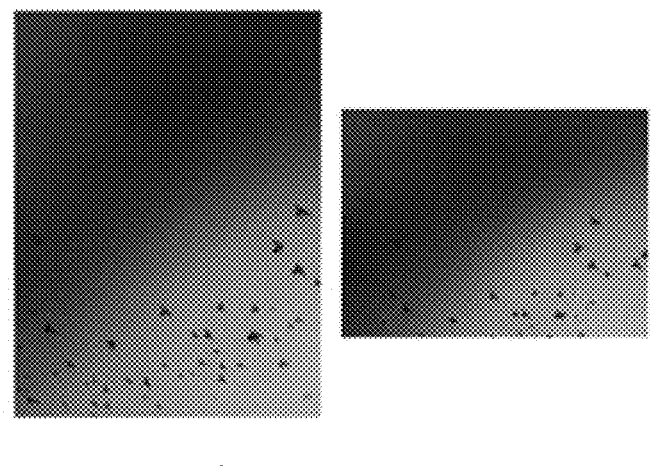
FIG. 10 is a schematic diagram of a fusion region picture, determined on the vertical preview interface and the horizontal preview interface respectively, of a square material picture during current picture centering fusion according to an exemplary embodiment.

FIG. 7 illustrates a schematic diagram 7a of a vertical material picture 310, a schematic diagram 7b of a vertical material picture 310a zoomed in during current picture centering fusion and a currently shot picture 330 displayed on a vertical preview interface 320, and a portion of the material picture 310a within the vertical preview interface 320 is a fusion region. FIG. 7 also illustrates a schematic diagram 7c of a vertical material picture 310b zoomed in during current picture centering fusion and a currently shot picture 350 displayed on a horizontal preview interface 340, and a portion of the material picture 310b within the horizontal preview interface 340 is a fusion region. FIG. 8 illustrates a schematic diagram 8a of a fusion region of the vertical material picture 310a obtained on the vertical preview interface 320, and a schematic diagram 8b of a fusion region of the vertical material picture 310b obtained on the horizontal preview interface 340. FIG. 9 illustrates a schematic diagram 9a of a square material picture 360; a schematic diagram 9b of the square material picture 360a zoomed in and the vertical preview interface 320, a portion of the material picture 360a within the vertical preview interface 320 being a fusion region; and a schematic diagram 9c of the square material picture 360b zoomed in and the horizontal preview interface 340, a portion of the square material picture 360b within the horizontal preview interface 340 being a fusion region. FIG. 10 illustrates a schematic diagram 10a of a fusion region of the square material picture 360a obtained on the vertical preview interface 320, and a schematic diagram 10b of a fusion region of the square material picture 360b obtained on the horizontal preview interface 340.

Operation S222b: Determine a target superposition edge according to a texture concentration direction if the fusion method is edge fusion, keep edges of the material picture and the currently shot picture consistent at the target superposition edge, and uniformly zoom the material picture according to the resolution of the currently shot picture to obtain a fusion region.

Specifically, if textures are concentrated at the upper half part of the material picture, the target superposition edge is an upper edge of the picture. If the textures are concentrated at the lower half part of the material picture, the target superposition edge is a lower edge of the picture. If the textures are concentrated at the left half part of the material picture, the target superposition edge is a left edge of the picture. If the textures are concentrated at the right half part of the material picture, the target superposition edge is a right edge of the picture. The material picture is uniformly zoomed in or out to contain the currently shot picture, and at least three edges of the material picture are superposed with edges of the currently shot picture, wherein the three edges include the target superposition edge, and a portion of the material picture within the framing preview interface is acquired to obtain a fusion region.

Figure 11:
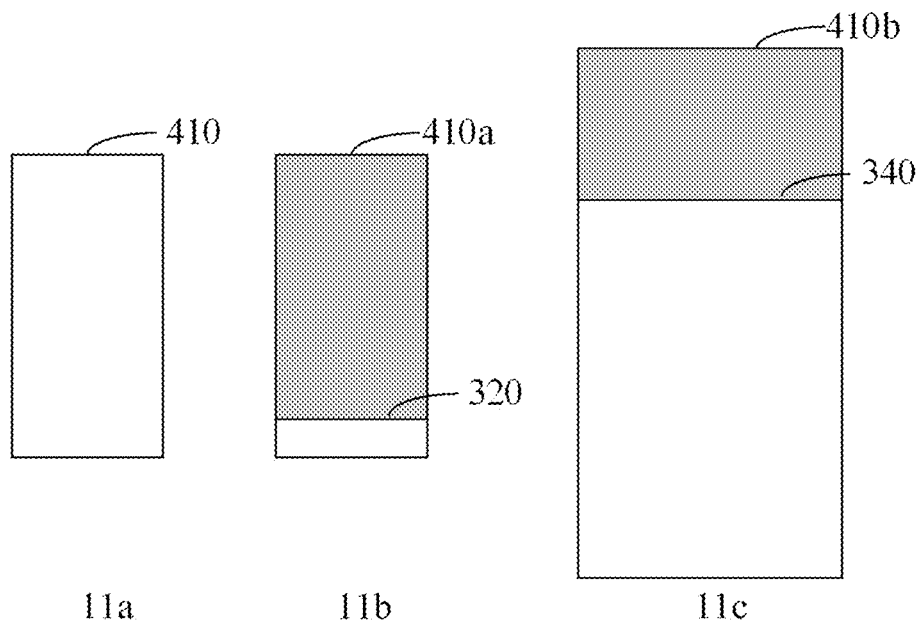
FIG. 11 is a schematic diagram of determining a fusion region of a material picture on the vertical preview interface and the horizontal preview interface respectively when a target superposition edge is an upper edge during edge fusion according to an exemplary embodiment.
Figure 12:
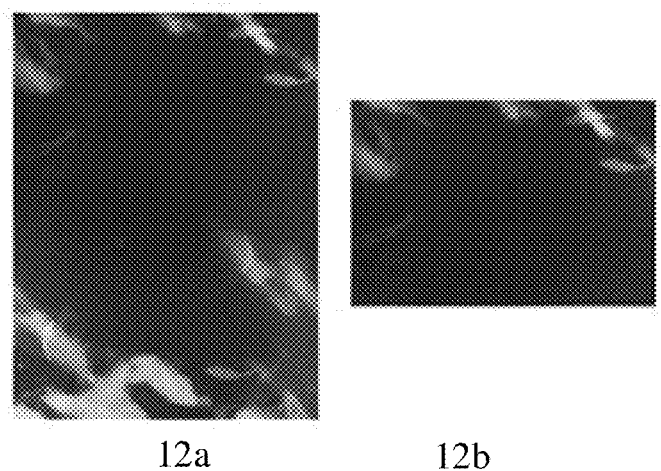
FIG. 12 is a schematic diagram of a fusion region picture, determined on the vertical preview interface and the horizontal preview interface respectively, of a material picture when the target superposition edge is the upper edge during edge fusion according to an exemplary embodiment.

FIG. 11 illustrates a schematic diagram 11a of a vertical material picture 410, a schematic diagram 11b of a vertical material picture 410a zoomed in by edge fusion when a target superposition edge is an upper edge, and the vertical preview interface 320, a portion of the material picture 410a within the vertical preview interface 320 being a fusion region, and a schematic diagram 11c of a vertical material picture 410b zoomed in by edge fusion when the target superposition edge is the upper edge and the horizontal preview interface 340, a portion of the material picture 410b within the horizontal preview interface 340 being a fusion region. FIG. 12 illustrates a schematic diagram 12a of a fusion region of the vertical material picture 410a obtained on the vertical preview interface 320 when the target superposition edge is the upper edge, and a schematic diagram 12b of a fusion region of the vertical material picture 410b obtained on the horizontal preview interface 340 when the target superposition edge is the upper edge.

Figure 13:
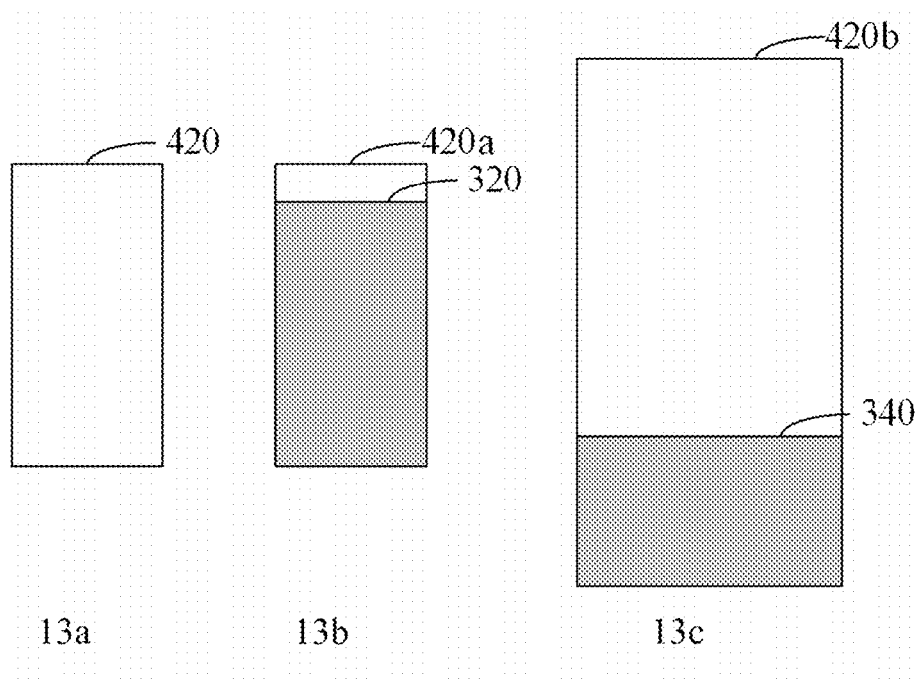
FIG. 13 is a schematic diagram of determining a fusion region of a material picture on the vertical preview interface and the horizontal preview interface respectively when the target superposition edge is a lower edge during edge fusion according to an exemplary embodiment.
Figure 14:
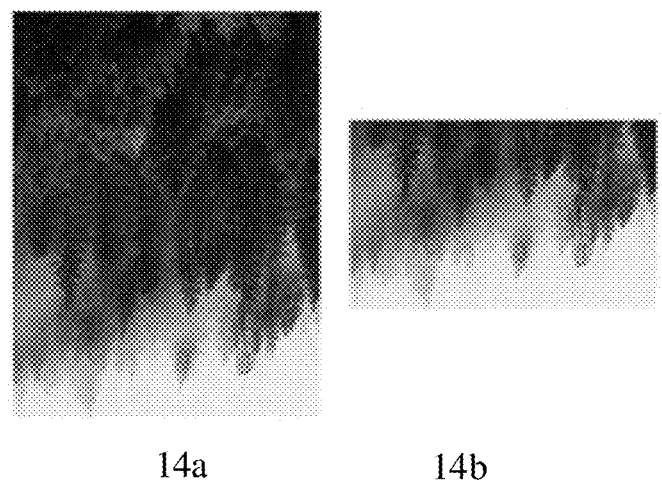
FIG. 14 is a schematic diagram of a fusion region picture, determined on the vertical preview interface and the horizontal preview interface respectively, of a material picture when the target superposition edge is the lower edge during edge fusion according to an exemplary embodiment.

FIG. 13 illustrates a schematic diagram 13a of a vertical material picture 420, a schematic diagram 13b of a vertical material picture 420a zoomed in by edge fusion when the target superposition edge is a lower edge and the vertical preview interface 320, a portion of the material picture 420a within the vertical preview interface 320 being a fusion region, and a schematic diagram 13c of a vertical material picture 420b zoomed in by edge fusion when the target superposition edge is the lower edge, and the horizontal preview interface 340, a portion of the material picture 420b within the horizontal preview interface 340 being a fusion region. FIG. 14 illustrates a schematic diagram 14a of a fusion region of the vertical material picture 420a obtained on the vertical preview interface 320 when the target superposition edge is the lower edge, and a schematic diagram 14b of a fusion region of the vertical material picture 410b obtained on the horizontal preview interface 340 when the target superposition edge is the lower edge.

Operation S222c: Zoom the material picture using the resolution of the currently shot picture as a target resolution to obtain a fusion region in response to the fusion method being complete fusion.

Figure 15:
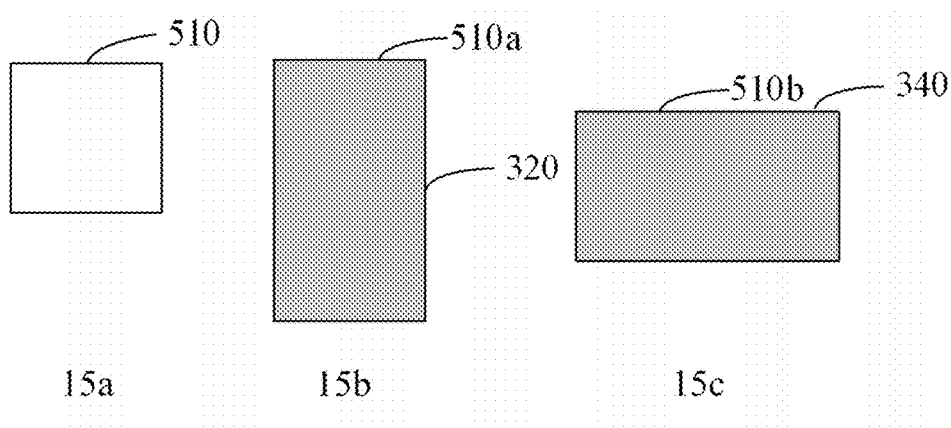
FIG. 15 is a schematic diagram of determining a fusion region of a material picture on the vertical preview interface and the horizontal preview interface respectively during complete fusion according to an exemplary embodiment.
Figure 16:
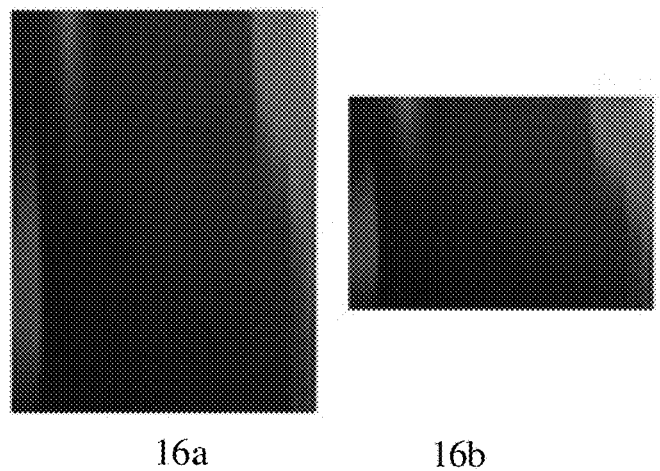
FIG. 16 is a schematic diagram of a fusion region picture, determined on the vertical preview interface and the horizontal preview interface respectively, of a material picture during complete fusion according to an exemplary embodiment.

Specifically, the material picture is zoomed in or out to the size of the currently shot picture, the complete fusion method does not need to ensure an equal proportion of the picture, and the zoomed material picture as big as the currently shot picture is completely (or entirely) fused with the currently shot picture subsequently. FIG. 15 illustrates a schematic diagram 15a of a material picture 510, a schematic diagram 15b of a material picture 510a zoomed in during complete fusion and the vertical preview interface 320, the whole material picture 510a zoomed in being a fusion region, and a schematic diagram 15c of a material picture 510b zoomed in during complete fusion and the horizontal preview interface 340, the whole material picture 510b zoomed in being a fusion region. FIG. 16 illustrates a schematic diagram 16a of a fusion region obtained on the vertical preview interface 320 during complete fusion, and a schematic diagram 16b of a fusion region obtained on the horizontal preview interface 340 during complete fusion.

Operation S222d: Determine that the material picture and the currently shot picture have the same central position in response to the fusion method being material picture centering fusion, and uniformly zoom the material picture according to the resolution of the currently shot picture to obtain a fusion region, the currently shot picture containing the material picture.

Figure 17:
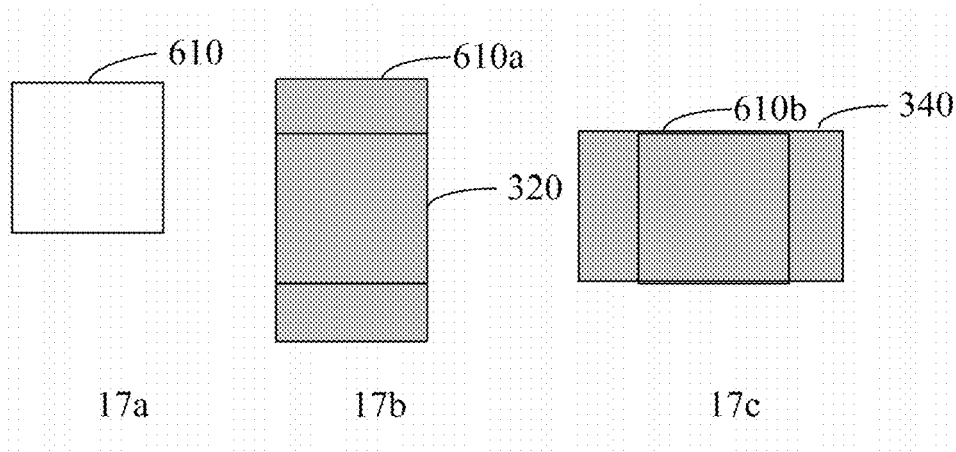
FIG. 17 is a schematic diagram of determining a fusion region of a material picture on the vertical preview interface and the horizontal preview interface respectively during material picture centering fusion according to an exemplary embodiment.
Figure 18:
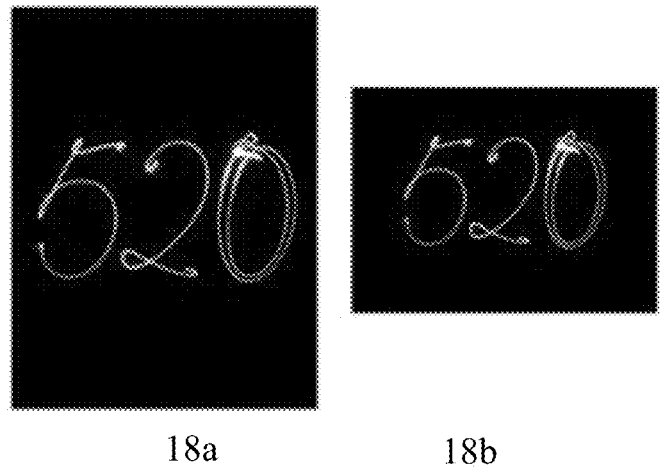
FIG. 18 is a schematic diagram of a fusion region picture, determined on the vertical preview interface and the horizontal preview interface respectively, of a material picture during material picture centering fusion according to an exemplary embodiment.

Specifically, the material picture is uniformly zoomed in or out to be contained by the currently shot picture, and at least two opposite edges of the material picture are superposed with edges of the currently shot picture, that is, the currently shot picture just contains the material picture, the center of a framing preview interface is superposed with the center of the material picture, the entire material picture is a fusion area, and the material picture is completely retained in the currently shot picture. FIG. 17 illustrates a schematic diagram 17a of a material picture 610, a schematic diagram 17b of a material picture 610a zoomed in during material picture centering fusion and the vertical preview interface 320, and the whole material picture 610a zoomed in being a fusion region a schematic diagram 17c of a material picture 610b zoomed in during material picture centering fusion and the horizontal preview interface 340, the whole material picture 610b zoomed in being a fusion region. FIG. 18 illustrates a schematic diagram 18a of a fusion region obtained on the vertical preview interface 320 during material picture centering fusion, and a schematic diagram 18b of a fusion region obtained on the horizontal preview interface 340 during material picture centering fusion.

In an exemplary embodiment, different fusion methods correspond to different processing operations, so that different material pictures are fused with the currently shot picture in the most suitable picture processing manner, and picture information of the material pictures is retained intelligently.

Figure 19:
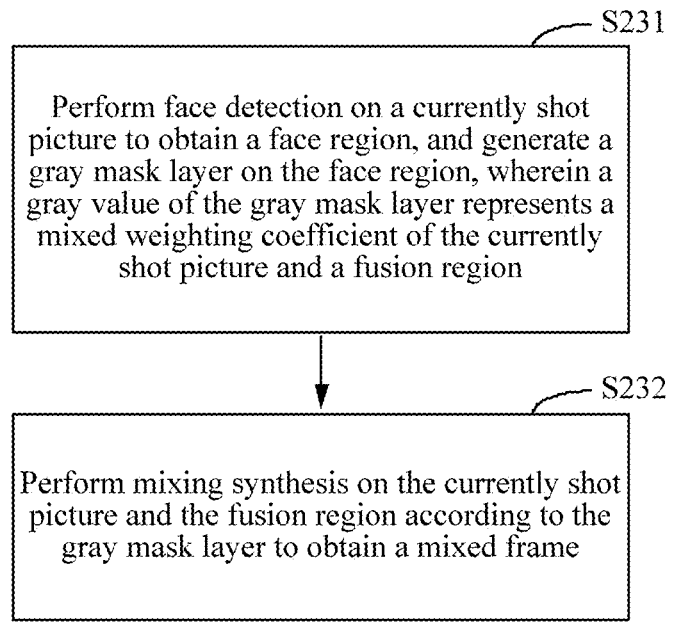
FIG. 19 is a flow diagram of mixing synthesis to obtain a mixed frame according to an exemplary embodiment.

In one embodiment, as shown in FIG. 19, operation S230 of performing mixing synthesis on the fusion region and the currently shot picture to obtain a mixed frame includes:

Operation S231: Perform face detection on the currently shot picture to obtain a face region, and generate a gray mask layer on the face region, wherein a gray value of the gray mask layer represents a mixed weighting coefficient of the currently shot picture and the fusion region.

Specifically, the face region of the currently shot picture may be obtained through a face detection algorithm, and a gray mask layer is generated in the face region. The gray value of the gray mask layer represents a mixed weighting coefficient of the currently shot picture and the fusion region, e.g., the gray value 0-255 corresponds to the weighting coefficient 1-0. If the weighting coefficient is larger, the degree of retention of the face region is higher, e.g., when the weighting coefficient is 1, the face region directly covers the fusion region; and when the weighting coefficient is 0, the fusion region directly covers the face region. By setting each gray value of the gray mask layer, the fusion effects of different regions of a face and the fusion region may be flexibly changed, and the fusion region is prevented from shading the face regions during fusion. The shape and size of the gray mask layer may be customized according to embodiments, and the gray mask layer may be in an irregular shape or be circular, square, etc. A portion beyond the gray mask layer may be weighted and fused according to a preset weighting coefficient.

Referring back to FIG. 19, operation S230 further includes:

Operation S232: Perform mixing synthesis on the currently shot picture and the fusion region according to the gray mask layer to obtain a mixed frame.

Specifically, pixel values of the currently shot picture and the fusion region are superposed. During superposition, the pixel values of the currently shot picture and the fusion region need to be superposed according to a weighting coefficient corresponding to each pixel of the gray mask layer in a region corresponding to the gray mask layer. If a coordinate range of the region corresponding to the gray mask layer is i<x≤j and m<y≤n, a corresponding weighting coefficient at a pixel (x,y) is $k_{(x,y)}$, a corresponding pixel value of the currently shot picture at the pixel (x,y) is $D_{(x,y)}$, and a corresponding pixel value of the fusion region at the pixel (x,y) is $T_{(x,y)}$, a pixel value of the corresponding mixed frame at the pixel (x,y) is $S_{(x,y)} = k_{(x,y)} D_{(x,y)} + (1 - k_{(x,y)}) T_{(x,y)}$.

Figure 20:
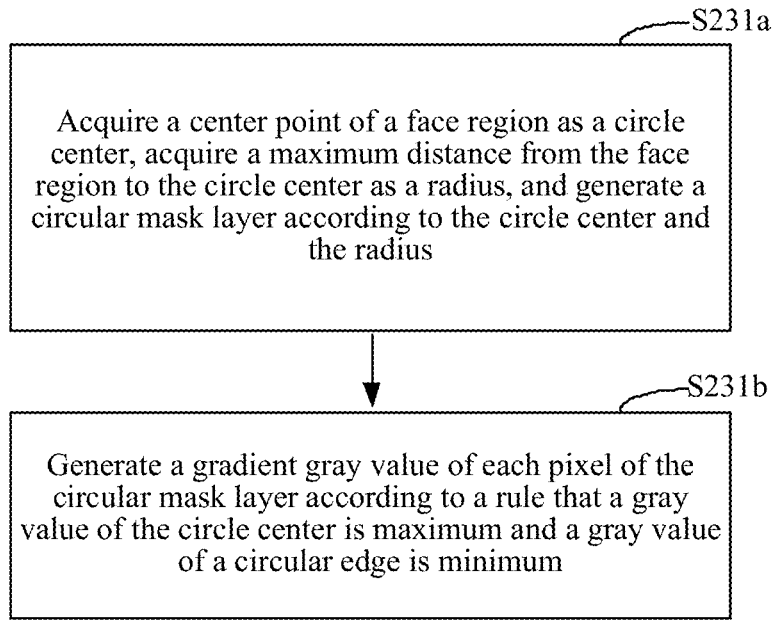
FIG. 20 is a flow diagram of generating a gray mask layer according to an exemplary embodiment.

In one embodiment, as shown in FIG. 20, operation S231 of generating a gray mask layer in a face region includes:

Operation S231a: Acquire a center point of the face region as a circle center, acquire a maximum distance from the face region to the circle center as a radius, and generate a circular mask layer according to the circle center and the radius.

Specifically, the face region is closest to a circle, and the maximum distance from the face region to the circle center is a radius, thereby ensuring that the circular mask layer may cover the entire face region, and generating the circular mask layer using the center point of the face region as the circle center and the maximum distance as the radius.

Operation S231b: Generate a gradient gray value of each pixel of the circular mask layer according to a rule that a gray value of the circle center is maximum and a gray value of a circular edge is minimum.

Specifically, the gray value of the center is maximum, e.g., pure black, the gray value of the circular edge is minimum, e.g., pure white, a gray value of the middle is gradually changed, and the circular mask layer having the gray values gradually changed from the circle center to the circumference is generated. By forming a gradient circular mask layer diffused outward using the circle center as a center, a good transition effect may be ensured while a clear face is ensured.

Figure 21:
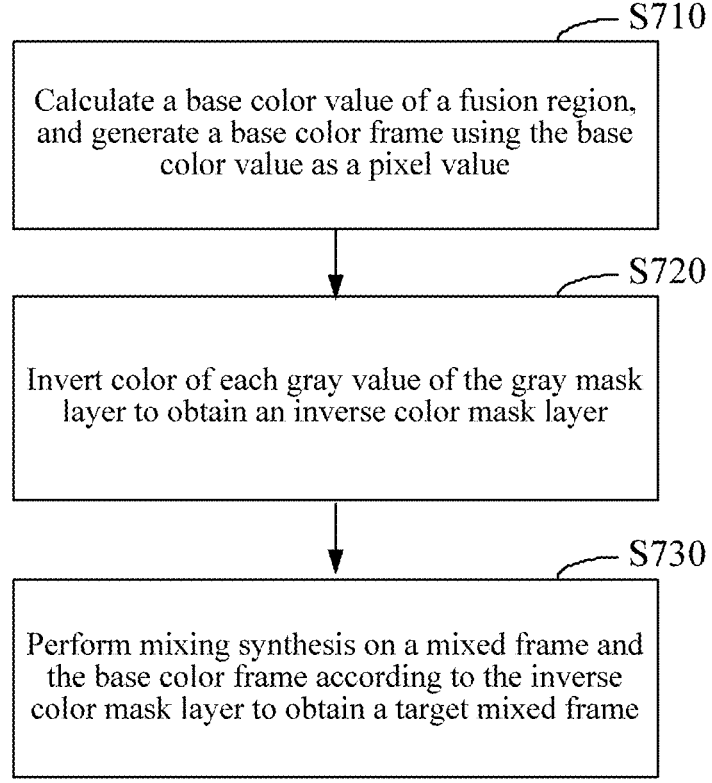
FIG. 21 is a flow diagram of base color adjustment on the mixed frame according to an exemplary embodiment.

In one embodiment, as shown in FIG. 21, after the operation of performing mixing synthesis on the currently shot picture and the fusion region according to the gray mask layer to obtain a mixed frame, the method further includes:

Operation S710: Calculate a base color value of the fusion region, and generate a base color frame using the base color value as a pixel value.

Specifically, due to the influence of the mask layer, the face region of the mixed intermediate frame may lack the base color of the material picture or the base color is insufficient and may be slightly abrupt in the entire mixed frame, so the fusion region needs to be adjusted according to the base color value thereof. The base color value may be a color value occurring most frequently in the fusion region, and the base color frame using the base color value as a pixel value is generated.

Operation S720: Invert color of each gray value of the gray mask layer to obtain an inverse color mask layer.

Specifically, the gray value of the inverse color mask layer represents a mixed weighting coefficient of the mixed frame and the base color frame, a portion of which the original gray value is 0 in the gray mask layer has a gray value of 255 after color inversion, and the weighting coefficient is changed from previous maximum to minimum.

Operation S730: Perform mixing synthesis on the mixed frame and the base color frame according to the inverse color mask layer to obtain a target mixed frame.

Specifically, base color filling processing is performed on the face region according to the inverse color mask layer. If a coordinate range of a region corresponding to the inverse color mask layer is i<x≤j and m<y≤n, a corresponding weighting coefficient at a pixel (x,y) is $P_{(x,y)}$, a corresponding pixel value of the mixed frame at the pixel (x,y) is $D'_{(x,y)}$, and a corresponding pixel value of the base color frame at the pixel (x,y) is $T'_{(x,y)}$, a pixel value of the corresponding target mixed frame at the pixel (x,y) is $S'_{(x,y)} = p_{(x,y)} D'_{(x,y)} + (1-p_{(x,y)}) T'_{(x,y)}$.

Figure 22:
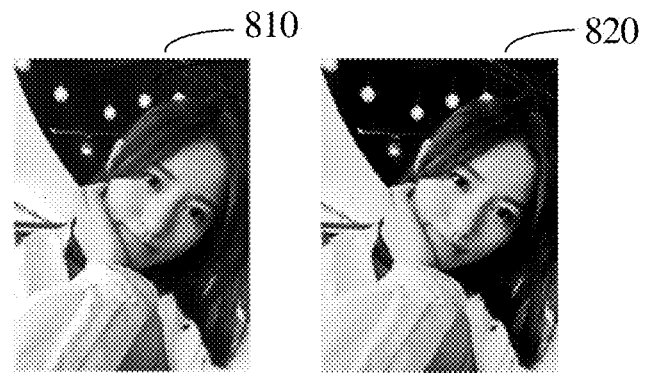
FIG. 22 is a schematic diagram of a currently shot picture and the currently shot picture after base color adjustment according to an exemplary embodiment.

In one specific embodiment, a specific process of performing mixing synthesis on a fusion region and a currently shot picture to obtain a mixed frame is as follows:

1. As shown in FIG. 22, base color adjustment is performed on a currently shot picture 810 to obtain a currently shot picture 820, wherein the base color adjustment includes adjusting contrast, hue, saturation and the like, so that the currently shot picture 820 has a certain style.

Figure 23:
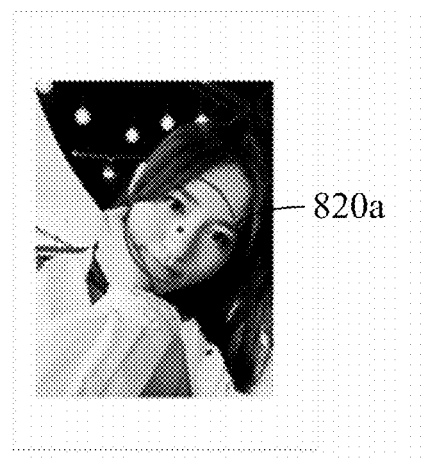
FIG. 23 is a schematic diagram of a detected face region according to an exemplary embodiment.
Figure 24:
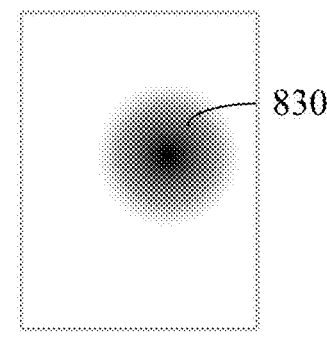
FIG. 24 is a schematic diagram of a gray mask layer according to an exemplary embodiment.
Figure 25:
FIG. 25 is a schematic diagram of a mixed frame according to an exemplary embodiment.

2. As shown in FIG. 23, face detection is performed on the currently shot picture to obtain a face region 820a, and a gray mask layer 830 corresponding to the face region 820a is generated, as shown in FIG. 24, wherein the gray mask layer is a circular mask layer, and gradient gray values in the circular mask layer are formed according to a rule that a gray value of a circle center is maximum and a gray value of a circular edge is minimum. The exterior of the circumference of the gray mask layer 830 is a normally superposed fusion region 840, and the interior of the circumference of the gray mask layer 830 is a face protection superposed fusion region in which a gray value of the gray mask layer represents a mixed weighting coefficient, thereby ensuring the definition of the face region. As shown in FIG. 25, a mixed frame 850 is obtained by mixing synthesis.

Figure 26:
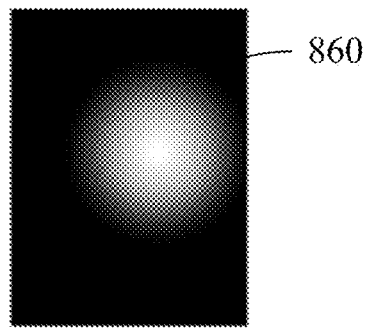
FIG. 26 is a schematic diagram of an inverse color mask layer according to an exemplary embodiment.
Figure 27:
FIG. 27 is a schematic diagram of a target mixed frame according to an exemplary embodiment.

3. A base color frame is generated using a base color value as a pixel value, and color of each gray value of the gray mask layer 830 is inverted to obtain an inverse color mask layer 860, as shown in FIG. 26, wherein the exterior of the circumference of the inverse color mask layer 860 is pure black, indicating that the mixed frame covers a base color frame. Mixing synthesis is performed on the mixed frame 850 and the base color frame according to the inverse color mask layer 860 to obtain a target mixed frame 870. As shown in FIG. 27, a face region of the target mixed frame 870 is filled with the base color value of the fusion region, so that the fusion appears to be natural.

Figure 28:
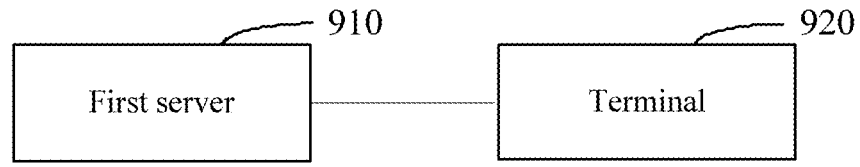
FIG. 28 is a structure diagram of a multiple exposure system according to an exemplary embodiment.

As shown in FIG. 28, provided is a multiple exposure system, including:

a first server 910, configured to receive a material picture acquisition request sent by a terminal and including search keywords including geographic location information, search according to the search keywords to obtain a corresponding material picture, and return the material picture, the first server pre-storing material pictures and corresponding picture associated information, and the picture associated information including picture location information; and a terminal 920, configured to process the material picture according to the resolution of the currently shot picture and the content of the material picture to obtain a fusion region, perform mixing synthesis on the fusion region and the currently shot picture to obtain a mixed frame, and display the mixed frame on a framing preview interface.

In an exemplary embodiment, the first server cooperates with the terminal. By pre-storing, by the first server, a large number of material pictures and picture associated information, including picture location information and providing a professional picture search server, a material picture may be conveniently and quickly obtained according to search keywords provided by a user, and an accurate target picture may be obtained according to geographic location information, so that the degree of fusion of multiple exposures is improved. The terminal processes the material picture according to a resolution of a currently shot picture and content of the material picture to obtain a fusion region, performs mixing synthesis on the fusion region and the currently shot picture to obtain a mixed frame, and displays the mixed frame on a framing preview interface, wherein the fusion region in the material picture is intelligently selected according to the representation of content details of the material picture and the resolution of the current framing mode, so that the intelligence of multiple exposures and the picture quality are further improved.

Figure 29:
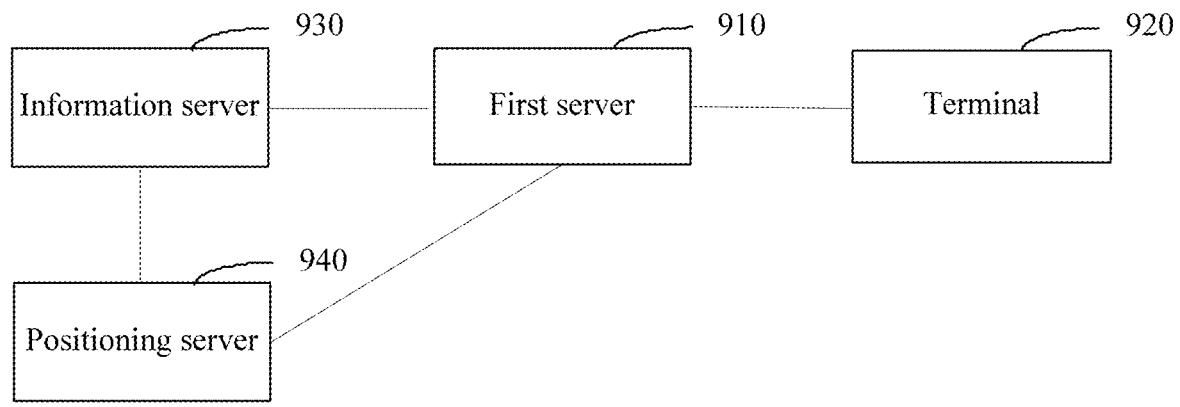
FIG. 29 is a structure diagram of a multiple exposure system according to another exemplary embodiment.

In one embodiment, as shown in FIG. 29, the system further includes:

an information server 930, configured to crawl a web page containing a scenic picture according to a crawler algorithm to obtain a material picture, and extract keywords of the web page as a picture label of the material picture, the picture label including a scenic name and a picture content description entry, send the picture label and the corresponding material picture to the first server 910, and send a geographic location acquisition request including the scenic name to a positioning server 940; and the positioning server 940, configured to return picture location information corresponding to the material picture to the first server 910 according to the scenic name, wherein the first server 910 is further configured to establish an index relation among the picture label, the picture location information and the material picture.

In an exemplary embodiment, the information server 930 constantly updates the material picture and extracts the web page keywords automatically used as a picture label, so that the material picture and the picture label are acquired automatically, conveniently and quickly without manual intervention. The picture label includes a scenic name, accurate location information may be returned from the positioning server 940 through the scenic name, and an index relation among the picture label, the picture location information and the material picture is established and stored in the first server, so that a material picture of an accurate location may be obtained by searching subsequently through GPS location information uploaded by the terminal, and a whole preprocessing process does not need manual intervention and is convenient and quick.

Figure 30:
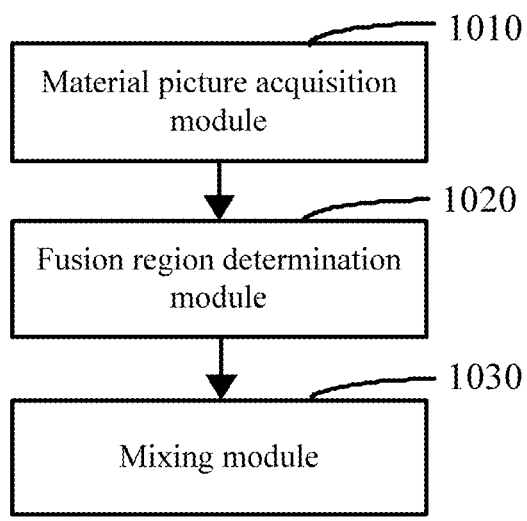
FIG. 30 is a structure diagram of a terminal according to an exemplary embodiment.

In one embodiment, as shown in FIG. 30, provided is a terminal. Part of or all of each of the following modules may be implemented through software, hardware and/or a combination thereof. The terminal includes:

a material picture acquisition module 1010, configured to send a material picture acquisition request including search keywords to a server, the search keywords including geographic location information so that the server searches according to the search keywords to obtain a corresponding material picture, and returns the material picture, the server pre-storing material pictures and corresponding picture associated information, and the picture associated information including picture location information;

a fusion region determination module 1020, configured to process the material picture according to a resolution of a currently shot picture and content of the material picture to obtain a fusion region; and a mixing module 1030, configured to perform mixing synthesis on the fusion region and the currently shot picture to obtain a mixed frame, and display the mixed frame on a framing preview interface.

In one embodiment, the search keywords also include picture content description information.

In one embodiment, the material picture is a picture obtained by crawling a web page containing a scenic picture according to a crawler algorithm. The picture associated information includes a picture label and picture location information. The picture label includes keywords extracted from the web page.

In one embodiment, the picture label includes a scenic name and a picture content description entry. The picture location information is location information returned by a positioning server according to a scenic name after a geographic location acquisition request including the scenic name is sent to the positioning server.

Figure 31:
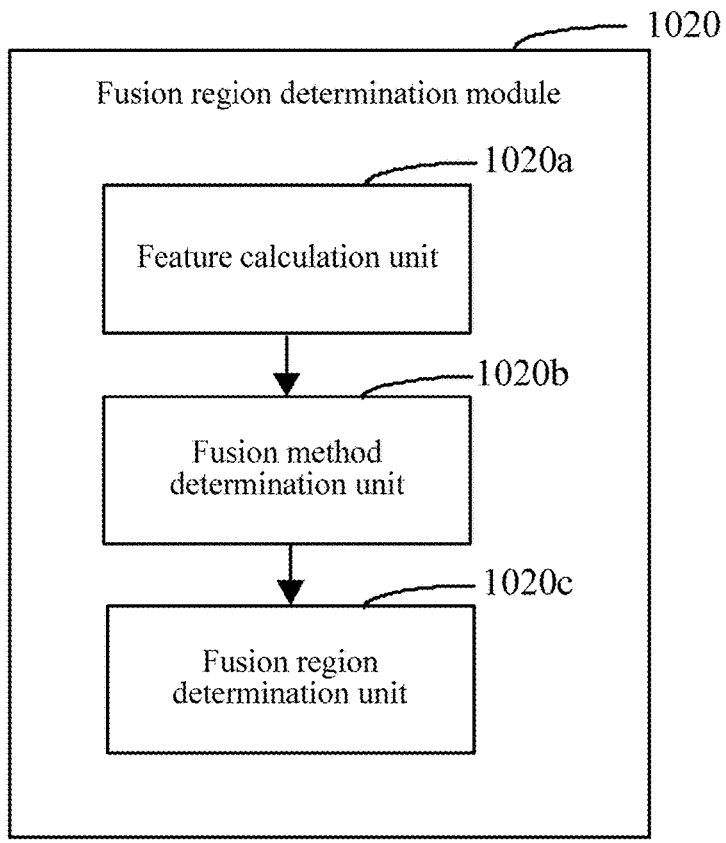
FIG. 31 is a structure diagram of a fusion region determination module according to an exemplary embodiment.

In one embodiment, as shown in FIG. 31, the fusion region determination module 1020 includes:

a feature calculation unit 1020a, configured to calculate and identify an image feature corresponding to the content of the material picture;

a fusion method determination unit 1020b, configured to determine a fusion method for the material picture according to the image feature; and a fusion region determination unit 1020c, configured to process the material picture according to a resolution of a currently shot picture and the fusion method to obtain a fusion region.

Figure 32:
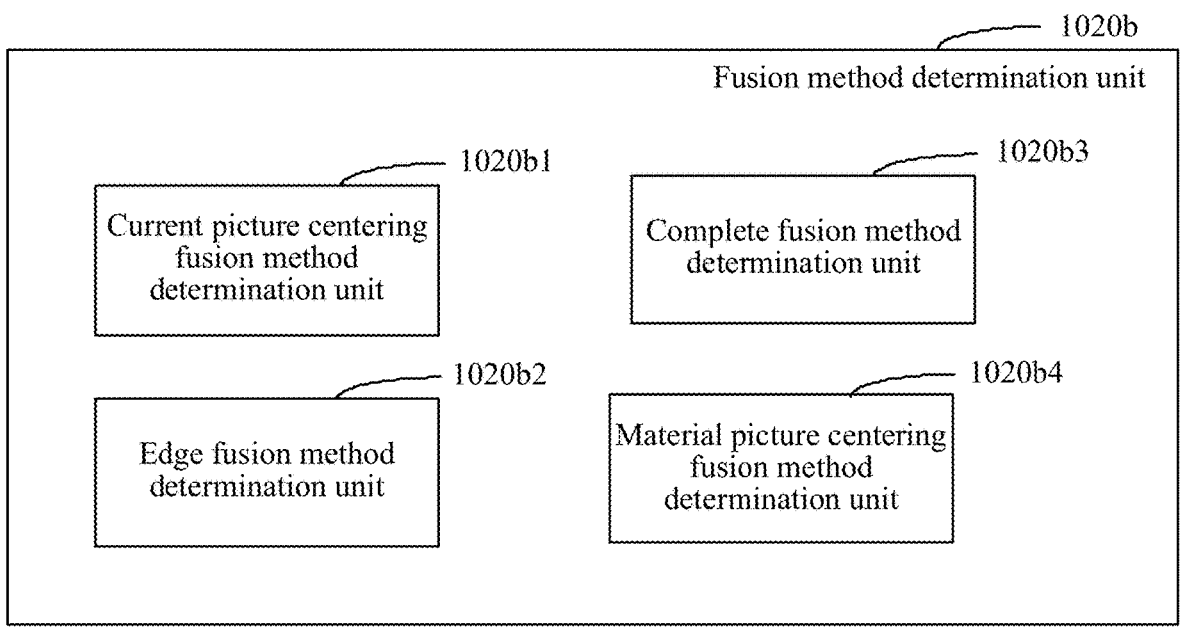
FIG. 32 is a structure diagram of a fusion method determination unit according to an embodiment.

In one embodiment, the image feature includes texture information. As shown in FIG. 32, the fusion method determination unit 1020b includes:

a current picture centering fusion method determination unit 1020b1, configured to determine current picture centering fusion as the fusion method in response to textures of the material picture being concentrated within a central preset range of the material picture;

an edge fusion method determination unit 1020b2, configured to determine edge fusion as the fusion method in response to textures of the material picture being concentrated at an edge of the picture;

a complete fusion method determination unit 1020b3, configured to determine complete fusion as the fusion method in response to textures of the material picture being flatly distributed in the picture; and a material picture centering fusion method determination unit 1020b4, configured to determine material picture centering fusion as the fusion method in response to textures of the material picture forming an independent graph.

Figure 33:
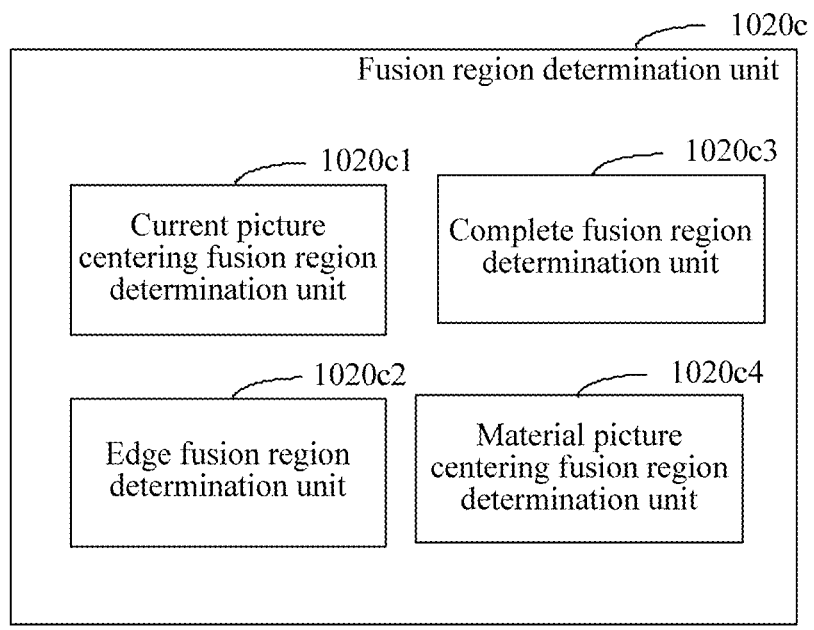
FIG. 33 is a structure diagram of a fusion region determination unit according to an exemplary embodiment.

In one embodiment, as shown in FIG. 33, the fusion region determination unit 1020c includes:

a current picture centering fusion region determination unit 1020c1, configured to determine that the material picture and the currently shot picture have the same central position if the fusion method is current picture centering fusion, and uniformly zoom the material picture according to the resolution of the currently shot picture to obtain a fusion region, the material picture containing the currently shot picture;

an edge fusion region determination unit 1020c2, configured to determine a target superposition edge according to a texture concentration direction if the fusion method is edge fusion, keep edges of the material picture and the currently shot picture consistent at the target superposition edge, and uniformly zoom the material picture according to the resolution of the currently shot picture to obtain a fusion region;

a complete fusion region determination unit 1020c3, configured to zoom the material picture using the resolution of the currently shot picture as a target resolution to obtain a fusion region if the fusion method is complete fusion; and a material picture centering fusion region determination unit 1020c4, configured to determine that the material picture and the currently shot picture have the same central position if the fusion method is material picture centering fusion, and uniformly zoom the material picture according to the resolution of the currently shot picture to obtain a fusion region, the currently shot picture containing the material picture.

Figure 34:
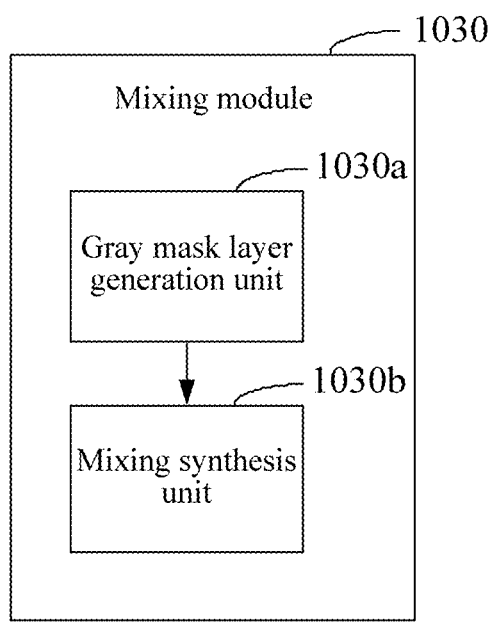
FIG. 34 is a structure diagram of a mixing module according to an exemplary embodiment.

In one embodiment, as shown in FIG. 34, the mixing module 1030 includes:

a gray mask layer generation unit 1030a, configured to perform face detection on a currently shot picture to obtain a face region, and generate a gray mask layer on the face region, wherein a gray value of the gray mask layer represents a mixed weighting coefficient of the currently shot picture and a fusion region; and a mixing synthesis unit 1030b, configured to perform mixing synthesis on the currently shot picture and the fusion region according to the gray mask layer to obtain a mixed frame.

In one embodiment, the gray mask layer generation unit 1030a is further configured to acquire a center point of the face region as a circle center, acquire a maximum distance from the face region to the circle center as a radius, generate a circular mask layer according to the circle center and the radius, and generate a gradient gray value of each pixel of the circular mask layer according to a rule that a gray value of the circle center is maximum and a gray value of a circular edge is minimum.

Figure 35:
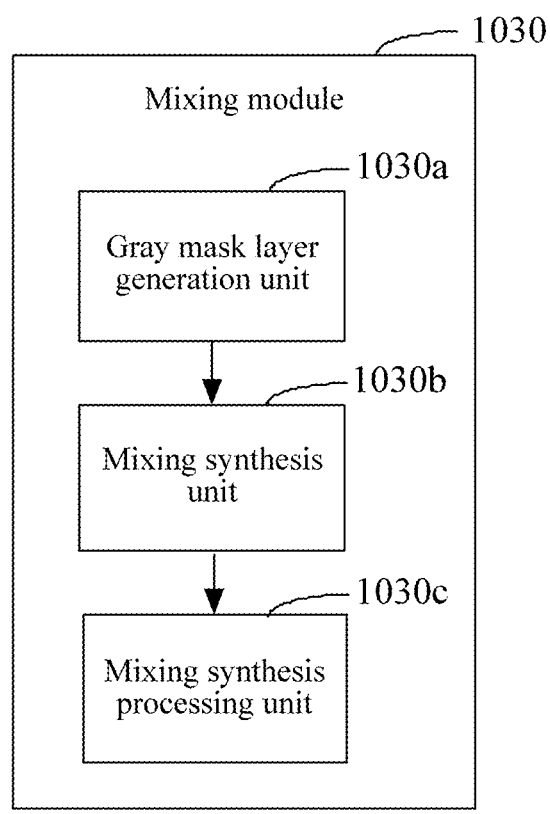
FIG. 35 is a structure diagram of a mixing module according to another exemplary embodiment.

In one embodiment, as shown in FIG. 35, the mixing module 1030 further includes:

a mixing synthesis processing unit 1030c, configured to calculate a base color value of a fusion region, generate a base color frame using the base color value as a pixel value, invert color of each gray value of the gray mask layer to obtain an inverse color mask layer, and perform mixing synthesis on a mixed frame and the base color frame according to the inverse color mask layer to obtain a target mixed frame.

It could be understood by a person of ordinary skill in the art that all of or part of the processes in the methods of the foregoing embodiments may be performed through a computer program instructing relevant hardware. The program may be stored in a computer readable storage medium. For example, in the exemplary embodiments, the program may be stored in a storage medium of a computer system and is executed by at least one processor (e.g., a central processing unit (CPU)) in the computer system to implement the processes in the embodiments of the foregoing methods. The storage medium may be a magnetic disk, an optical disk, a Read-Only Memory (ROM) or a Random Access Memory (RAM), etc.

The technical features of the above-described embodiments may be combined arbitrarily. For the purpose of simplicity in description, all possible combinations of the technical features in the above embodiments are not described. However, as long as the combinations of these technical features do not have contradictions, they shall fall within the scope of the specification.

The foregoing embodiments only describe several implementations of the disclosure, and their description is specific and detailed, but cannot therefore be understood as a limitation to the patent scope of the disclosure. It should be noted that a person of ordinary skill in the art may further make variations and improvements without departing from the conception of the disclosure, and these all fall within the protection scope of the disclosure. Therefore, the patent protection scope of the disclosure should be subject to the appended claims.

What is claimed is:

1. A multiple exposure method, comprising:
sending, by a terminal, a material picture acquisition request;
receiving, by the terminal, a material picture in response to the material picture acquisition request, wherein the material picture comprises a picture obtained from a web page containing a scenic picture based on geographic location information provided by a user of the terminal;
processing, by the terminal, the material picture based on a resolution of a currently captured picture and content of the material picture to obtain a fusion region; and
performing, by the terminal, mixing synthesis on the fusion region and the currently captured picture to obtain a mixed frame,
wherein the processing comprises:
obtaining and identifying an image feature corresponding to the content of the material picture;
determining a fusion method based on the image feature; and
processing the material picture based on the resolution of the currently captured picture and the fusion method, to obtain the fusion region.

2. The method according to claim 1, wherein the material picture acquisition request includes a search keyword, the search keyword comprising the geographic location information and information about a picture content description.

3. The method according to claim 1, wherein the material picture comprises the picture obtained from the web page containing the scenic picture based on a crawler algorithm, and the material picture is obtained among material pictures associated with corresponding picture associated information, the picture associated information comprising a picture label and the picture label comprising at least one keyword extracted from the web page.

4. The method according to claim 3, wherein the picture label comprises a scenic name and a picture content description, and the picture associated information further comprises picture location information, the picture location information comprising location information that is obtained through a positioning based on the scenic name.

5. The method according to claim 1, wherein the image feature comprises information regarding texture of the material picture, and the determining comprises:
determining current picture centering fusion as the fusion method in response to the texture of the material picture being concentrated within a central preset range of the material picture, the fusion method that fuses by using a central region of the material picture.

6. The method according to claim 1, wherein the image feature comprises information regarding texture of the material picture, and the determining comprises:
determining edge fusion as the fusion method in response to the texture of the material picture being concentrated at an edge region of the material picture.

7. The method according to claim 1, wherein the image feature comprises information regarding texture of the material picture, and the determining comprises:
determining complete fusion as the fusion method in response to the texture of the material picture being uniformly distributed in the material picture.

8. The method according to claim 1, wherein the image feature comprises information regarding texture of the material picture, and the determining comprises:
determining material picture centering fusion as the fusion method in response to the texture of the material picture forming an independent graph.

9. The method according to claim 1, wherein the processing the material picture according to the resolution of the currently captured picture and the fusion method comprises:
determining that the material picture and the currently captured picture have a same central position in response to the fusion method being current picture centering fusion, and uniformly zooming the material picture according to the resolution of the currently captured picture to obtain the fusion region, the material picture containing the currently captured picture.

10. The method according to claim 1, wherein the processing the material picture based on the resolution of the currently captured picture and the fusion method comprises:
determining a target superposition edge based on a texture concentration direction in response to the fusion method being edge fusion, maintaining edges of the material picture and the currently captured picture consistent at the target superposition edge, and uniformly zooming the material picture based on the resolution of the currently captured picture to obtain the fusion region.

11. The method according to claim 1, wherein the processing the material picture based on the resolution of the currently captured picture and the fusion method comprises:
zooming the material picture using the resolution of the currently captured picture as a target resolution to obtain the fusion region in response to the fusion method being complete fusion.

12. The method according to claim 1, wherein the processing the material picture based on the resolution of the currently captured picture and the fusion method comprises:
determining that the material picture and the currently captured picture have the same central position in response to the fusion method being material picture centering fusion, and uniformly zooming the material picture based on the resolution of the currently captured picture to obtain the fusion region, the currently captured picture containing the material picture.

13. The method according to claim 1, wherein the performing comprises:
performing face detection on the currently captured picture to obtain a face region;
generating a gray mask layer on the face region, a gray value of the gray mask layer representing a mixed weighting coefficient of the currently captured picture and the fusion region; and
performing the mixing synthesis on the currently captured picture and the fusion region based on the gray mask layer to obtain the mixed frame.

14. The method according to claim 13, wherein the generating comprises:
acquiring a center point of the face region as a circle center, acquiring a maximum distance from the face region to the circle center as a radius, and generating a circular mask layer based on the circle center and the radius; and
generating a gradient gray value of each pixel of the circular mask layer based on a rule that a gray value of a center is maximum and a gray value of a circular edge is minimum.

15. The method according to claim 13, further comprising:
obtaining a base color value of the fusion region, and generating a base color frame using the base color value as a pixel value;
inverting color of each gray value of the gray mask layer to obtain an inverse color mask layer; and
performing the mixing synthesis on the mixed frame and the base color frame based on the inverse color mask layer to obtain a target mixed frame.

16. A terminal, comprising a memory and a processor, the memory storing computer readable instructions, and the computer readable instructions, when executed by the processor, causing the processor to perform:
sending a material picture acquisition request;
receiving a material picture in response to the material picture acquisition request, wherein the material picture comprises a picture obtained from a web page containing a scenic picture based on geographic location information provided by a user of the terminal;
processing the material picture based on a resolution of a currently captured picture and content of the material picture to obtain a fusion region; and
performing mixing synthesis on the fusion region and the currently captured picture to obtain a mixed frame,
wherein the processing comprises:
obtaining and identifying an image feature corresponding to the content of the material picture;
determining a fusion method based on the image feature; and
processing the material picture based on the resolution of the currently captured picture and the fusion method to obtain the fusion region.

17. A non-transitory computer readable storage medium storing computer readable instructions, the computer readable instructions, when executed by one or more processors, causing the one or more processors to perform:
sending, by a terminal, a material picture acquisition request;
receiving, by the terminal, a material picture in response to the material picture acquisition request, wherein the material picture comprises a picture obtained from a web page containing a scenic picture based on geographic location information provided by a user of the terminal, the picture associated information comprising picture location information;
processing the material picture based on a resolution of a currently captured picture and content of the material picture to obtain a fusion region; and
performing mixing synthesis on the fusion region and the currently captured picture to obtain a mixed frame,
wherein the processing comprises:
obtaining and identifying an image feature corresponding to the content of the material picture;
determining a fusion method based on the image feature; and
processing the material picture based on the resolution of the currently captured picture and the fusion method to obtain the fusion region.

18. The terminal according to claim 16, wherein the performing comprises:
performing face detection on the currently captured picture to obtain a face region;
generating a gray mask layer on the face region, a gray value of the gray mask layer representing a mixed weighting coefficient of the currently captured picture and the fusion region; and
performing the mixing synthesis on the currently captured picture and the fusion region based on the gray mask layer to obtain the mixed frame.

* * * * *